Oct. 29, 1935.  A. W. FRANZMEIER  2,019,181
STRAINER
Filed July 17, 1933
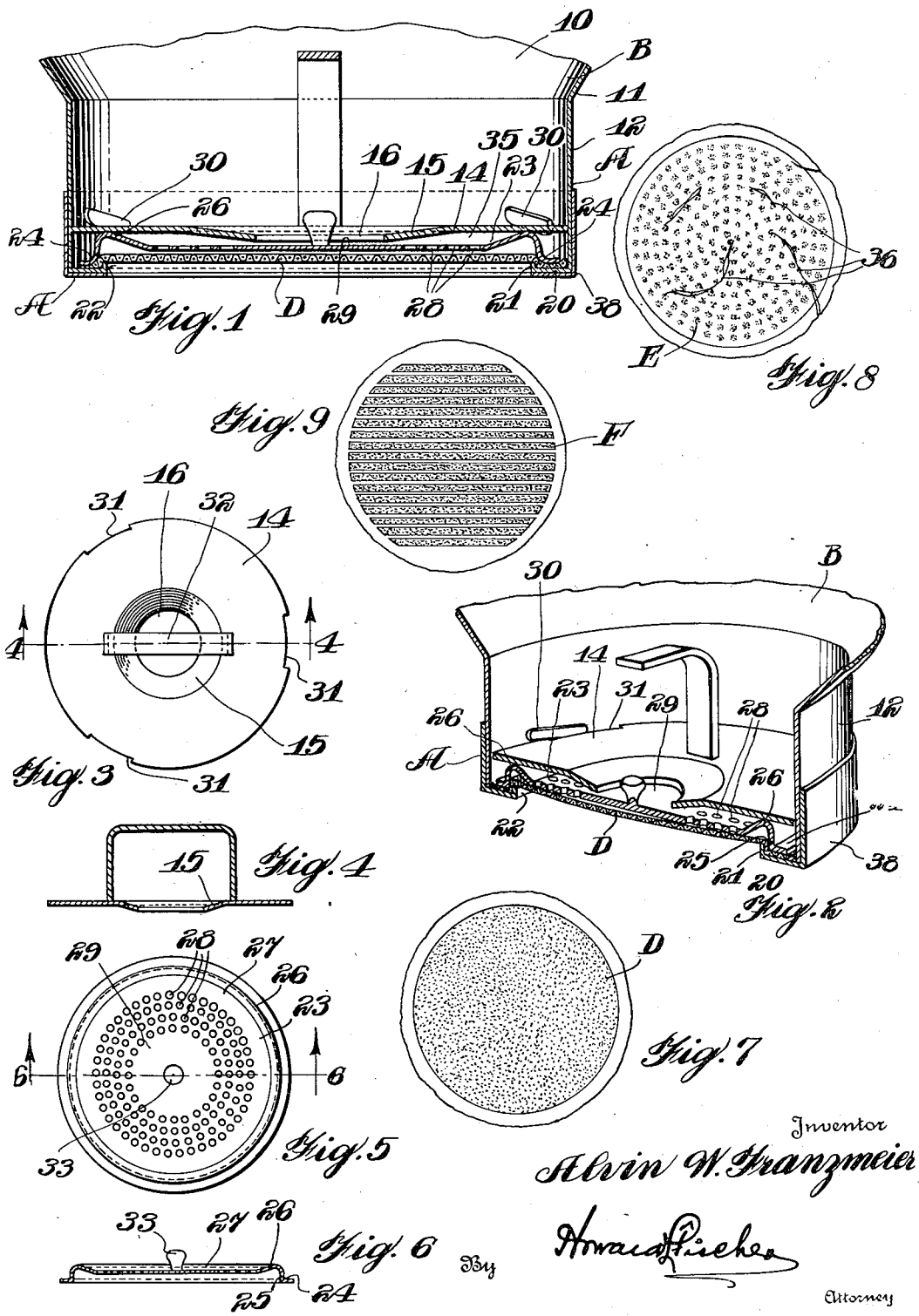
Inventor
Alvin W. Franzmeier
By Howard Fischer
Attorney Patented Oct. 29, 1935

2,019,181

UNITED STATES PATENT OFFICE 2,019,181

STRAINER

Alvin W. Franzmeier, Rich Valley, Minn.

Application July 17, 1933, Serial No. 680,799

7 Claims. (Cl. 210—159)

This is an improvement in strainers adapted to be used for straining milk or other liquid, where a replaceable filter disc is used through which the milk is strained. A primary feature of this strainer resides in giving a faster straining action through the same without sacrificing the efficiency of the strainer in clarifying the liquid passing through the filter disc.

It is also a feature to provide a strainer capable of using a cotton filter disc or a filter disc made of any suitable material, wherein the strainer is so constructed as to prevent a scrubbing, washing or channeling of the filter disc which has a tendency to weaken the strainer in spots or may even wear spots of the strainer disc so thin that the filtering efficiency is greatly impaired. The structure of my strainer is designed to overcome these disadvantages and in addition give better efficiency and faster straining.

I provide a strainer wherein a greater straining area of the filter disc is exposed to operate to strain the milk or liquid through the same, and thus the time required for straining is reduced, making my strainer faster as well as being more economical to manufacture.

Heretofore strainers were made with a perforated type of bottom, having round or other shaped holes and also of an interwoven wire mesh bottom upon which the filter disc was adapted to be supported, which blocked considerable of the area of the filter element. Then it was found that an advancement in the art could be made by forming the bottom of a grid made up of a series of parallel wires spaced apart. This grid form of bottom supported the filter disc or element in a better manner to overcome washing or channeling of the filter disc by the action of the milk or liquid in the same, and to expose a greater area of the filter element through which the milk or liquid could be strained. Thus the grid bottom was faster and more efficient in filtering than the former types. I have found with my filter that I can do away with all of these former types of supporting the filter discs. With my construction, the filter disc is supported over the opening through which the milk or liquid is strained, free to permit virtually the entire area of the filter disc to actively strain the milk through the same and yet without channeling, washing or weakening any part of the filter disc during the straining operation. By this accomplishment I have speeded up the filtering of liquid through my strainer to get the greatest possible filtering efficiency.

My strainer is provided with means for removably supporting the filter disc locked in operative position and guarded from the load of the liquid being strained therethrough. This means for supporting the filter discs includes baffle and perforated plate means associated together to direct the liquid to the filter disc so as to permit the same to strain the liquid rapidly and at the same time protecting the filter disc and preventing any possible washing or scrubbing action of the liquid against the surface of the filter in the operation of my strainer.

An economical structure of my strainer consists in means for locking the filter disc or element directly in the bottom of the strainer bowl. In this construction, I provide a locking baffle plate which is positioned directly above and which holds the perforated baffle and guard plate and which is adapted to clamp the marginal edge of the filter disc or element in operative position stretched across an unguarded opening. Thus the filter element is suspended across the opening through which the liquid is adapted to pass in filtering, however, the filter element is guarded and protected in a manner so as to direct the liquid equally over the surface of the same by reason of the baffle locking plate and the baffle perforated clamping plate.

While I have disclosed the primary objects above and it will be apparent that the construction is not only more simple and economical to manufacture than strainers which have been used heretofore, the details of the construction which give certain operating features are important to provide an efficient strainer without the undesirable objections found in former types of strainers.

In the drawing forming part of this specification:

Figure 1 is an enlarged section, showing a detail of the lower portion of the bowl where the collar which supports the strainer is formed integral with the lower end of the bowl.

Figure 2 is a perspective detailed section of the structure illustrated in Figure 1.

Figure 3 is a plan view of the clamping baffle plate of the structure of Figures 1 and 2.

Figure 4 is a section on the line 4—4 of Figure 3.

Figure 5 is a plan view of the perforated baffle strainer element clamping plate of Figure 1.

Figure 6 is a section on the line 6—6 of Figure 5.

Figure 7 illustrates a filter disc or element of cotton fibres, or the like, showing a replica of the sediment over the entire straining area of the disc.

Figure 8 illustrates a cotton filter disc, showing the sediment thereon, and showing the channeling caused by the action of the straining liquid against the same where the old types of perforated bottom supports were provided in the strainer for the disc.

Figure 9 illustrates a cotton fibre filter disc, showing the sediment on the same, where the disc has been supported upon a grid support in the strainer, which was an advancement in supports for the filter disc over the form of support used for the filter disc illustrated in Figure 14.

My strainer A is adapted to be operated with a bowl B of any design of construction, which holds a supply of liquid to be strained. Where the bowl B is used for straining milk it may be desirable to provide the same in the form of construction illustrated primarily in Figures 1 and 2, wherein the body 10 of the same forms a large bowl into which the milk is poured.

In the preferred structure of Figures 1 and 2, the clamping baffle plate 14 acts as a bottom when in operative position in the bowl B, and is slightly concaved at 15 toward the axis and formed with an axial opening 16.

In the preferred structure of Figures 1 and 2, the cylindrical lower end 12 of the bowl B is formed with a horizontal inwardly extending integral portion 20 on the inner edge of which I form an upstanding annular flange 21. The portion 20 forms a flat bottom channel with the side 12 and the inner upstanding flange 21. The channel ring 20 forms an important feature in holding the straining disc or element D stretched across the opening 22 in the cylindrical end 12.

The strainer disc or element D is laid across the opening 22 with its marginal edge projecting across the channel portion 20. A guard plate 23 which is formed with an annular shoe portion 24 about the edge of the same, in the preferred construction, is adapted to fit down over the filter or strainer element D with the shoe portion 24 resting in the channel 20 to pinch the marginal edge of the filter element D in the channel 20. The plate 23 is formed with an annular shoulder edge 25 inside of the shoe portion 24 which comes in close proximity to the upstanding edge 21 of the channel 20, thereby causing the filter element to be bound by the upstanding edge 21 to hold the same stretched across the opening 22 in the lower end of the cylindrical portion 12 when the plate 23 rests upon the same. This locks the strainer or filter element D in operative position, as illustrated in Figures 1 and 2.

The strainer element guard plate 23 is formed with an upwardly curved annular bead 26 which arches over the edge 21 and integrally connects the shoe portion 24 with the center portion 27 of the same. The portion 27 extends horizontal and is raised slightly out of the plane of the lower edge of the annular shoe portion 24. This portion 27 is formed with a series of perforations 28 which form a ring-like perforated portion around the center non-perforated guard portion 29 which extends from the axis of the plate 23 to the first row of perforations 28. The center portion 29 acts as a non-perforated guard or baffle surface directly below the opening 16 and positioned above the strainer element D and provides an important function in the operation of my strainer as will be more fully hereinafter set forth.

In the preferred construction, the clamping baffle plate 14 is removably held in the cylindrical portion 12 of the bowl B by engaging the lugs 30 formed in the inner surface of the side wall of the cylindrical portion 14 and the plate 14 is notched out at 31 to permit the same to be slipped under the lugs 30 when the clamping plate 14 is placed against the disc locking plate 23. In this form the plate 14 has a loop handle 32 which extends over the center opening 16 and the operator may engage this handle to remove or attach the plate 14 in the strainer A. The lugs 30 may be formed to extend angularly or helically so that when the edge of the plate 14 engages under the same, the lugs will tend to act as a cam to force the plate 14 against the annular upstanding bead 26 of the plate 23. Thus the plate 14 will slide on the bead 26 without rotating the plate 23, but forcing the shoe 24 of the same down against the marginal edge of the filter disc D and thereby clamp the disc without wrinkling or skew-geeing the same, in the preferred construction.

In the preferred construction, the perforated baffle plate 23 is provided with a central hand engaging knob 33 which permits it to be lifted off of the filter disc D when the filter A is taken apart. This permits the filter disc or element D to be readily removed and replaced at any time it is desired.

The strainer A in its preferred form is of a simple nature, including the channel 20 formed integral in the bottom of the cylindrical portion 12 with the large straining opening 22 over which the filter disc D extends and which is locked in place by the perforated plate 23 with the clamping baffle plate 14 fixed by the lugs 30 extending over the top of the same. It is easy to replace the strainer disc D by removing the locking plate 14 and the plate 23.

A primary feature of my strainer A resides in providing a strainer having a greater efficiency and wherein the filter disc D is guarded against any washing action of the liquid or milk as it is strained through the same. The locking plate 14 acts as a guard and baffle above the plate 23, being spaced therefrom to provide a chamber 35 between the plate 14 and the plate 23 into which the liquid being strained passes by entering through the axial opening 16. The design and formation of the plate 23 with the center non-perforated baffle portion 29 directs the flow of liquid coming through the opening 16 in the chamber 35 toward the upstanding annular rib 26, spread equally over the openings 28. Liquid then passes out of the openings 28 from the chamber 35 onto the filter disc D in a manner to strain through the filter D without the slightest washing or channeling action and thus I am able to use a cotton filter disc or other similar filtering disc without any danger of weakening the same and with the advantage of using the entire straining area with no supports under the disc which will retard the straining action through the same, giving a fast and efficient straining action with my strainer.

Figures 8 and 9 illustrate strainer discs E and F to show the way the sediment was retarded on the surface thereof and to give a comparative example of how the supports used under these respective discs blocked the area against straining action.

In the filter disc E in Figure 8 I have shown by the ridges or channels 36 how the liquid being strained through the same has washed or scrubbed against the surface of the disc E, weakening the same in these spots or channels. It will be noted that a large portion of the area was blocked by the perforated supporting disc.

In Figure 9 the filter disc F illustrates the sediment collected between the grid bars which support the disc F in filtering operation. Each of these bars block that much of the area of the disc F as is represented by the width of each bar where there is no sediment. It was found in practice that the grid support used for the disc F was an improvement over the support used for the disc E because it prevented washing or weakening of the disc. However, it will be apparent also that my strainer structure is an improvement over the grid form of support, because virtually the entire area of the disc D may be actively used to strain the liquid through the same, there being no supports under this area. I accomplish this by the guard baffle plate or bottom portion 14 and the perforated baffle guard plate 23, the shoe 24 of which bears directly against the marginal edge of the disc D to hold it locked in the channel ring 20, yet permitting the disc to be easily removed and changed when it is desired.

The lower end of the cylindrical portion 12 is reinforced with a wearing collar portion 38 which extends down the outside of the sleeve 12 and over the bottom of the channel portion 20. This wearing collar 38 protects the lower edge of the strainer A. It will be apparent that in use the strainer will be set down on this wearing collar so that the wear and tear will come on this collar rather than on the channel portion 20. This wearing collar 38 also reinforces the lower edge of the strainer A.

In my strainer A the filter disc D is clamped taut across the opening 22 in the bottom of the strainer, while the strainer element is guarded against the weight of the liquid in the bowl B, except that portion of the liquid which passes through the axial opening 16 which is set in close proximity to the closed portion 29 by the concaved portion 15 and then the liquid goes on through the perforated openings 28. The weight or pressure of the liquid is just sufficient to slightly bow the center of the filter element D in the act of straining but there is no washing action or scrubbing so that the filter element is fully protected and yet free to permit all except the marginal edge which is clamped in the channel ring 20, to provide a straining area through which the liquid may be efficiently strained.

My strainer is virtually fool-proof against jarring or shaking, journalling or washing. The tendency for the average user of a strainer is to run all of the milk he possibly can through any one individual pad or strainer. When the milk flow slows up, there is considerable temptation to shake or jar the strainer on the can in order to speed up the flow, however, destroying the efficiency.

The construction of my strainer not only gives additional speed in straining, eliminating a large percentage of the temptation to shake or jar the same, but should the operator do so, it is almost impossible to injure the straining cotton or filter disc or increase the flow by doing so. When the flow of the strainer decreases the filter disc should be changed.

In my strainer I have provided a structure wherein the fibres of the straining disc are undisturbed and cannot be washed, journalled, or the strainer shaken to injure the same. Thus I provide a strainer wherein the sediment removal is far more efficient, I believe than strainers which have been provided heretofore. This is important because it stands to reason that as soon as the fibres of the straining disc are disturbed so that certain portions of the disc would be thinned out, piling up the surplus fibres in other places, the milk will naturally follow the path of least resistance and gradually wear a hole right through the thin spots. These are the difficulties which have been experienced in former strainers, and I believe that my strainer entirely overcomes these in a very satisfactory manner.

I claim:

1. A milk strainer including, a milk supporting bowl, a straining collar formed in the bottom of said bowl with a large axial opening, a strainer gripping and supporting channel formed about said opening, a perforate guard plate having an annular shoe adapted to rest on the marginal edge of the strainer element extending across said opening, an axial non-perforated portion formed in said guard plate, a clamping baffle plate adapted to be positioned above said guard plate having an axial opening above said non-perforated axial portion of said perforated plate, said axial opening in said clamping plate being positioned in close proximity to said non-perforated axial portion of said perforate guard plate, and means for removably clamping said baffle locking plate in a manner to force the shoe of said perforated guard plate against the annular margin of a straining element to hold the same in operative position.

2. A milk strainer including, a milk receiving bowl, an opening formed in the bottom of said bowl, an annular shoulder formed about said opening, having a ring-like clamping edge, a filter element adapted to rest on said edge and shoulder, a guard plate having a marginal filter element engaging shoe formed thereabout, an annular upstanding bead adjacent said shoe, a ring-like perforated area formed about a non-perforated axial area, and a clamping plate adapted to engage said upstanding bead and having an axial opening positioned adjacent said non-perforated opening of said first plate, said clamping plate and said first plate forming protective guard means for the filtering surface of said element to permit milk to be strained therethrough substantially equally throughout the area confined within the marginal edge of said filtering element and without washing or channeling said filter element.

3. A strainer including a milk containing bowl, an inwardly extending flange in said bowl, adapted to support the circumferential edge of a flexible straining pad, a strainer guard plate having a ring of perforations thereon and a central closed portion, a baffle plate having a central opening to permit the head of milk within the bowl to rest upon said central closed portion of said guard plate, said baffle plate being rotatable relative to said guard plate, and means on said bowl rotatably engageable with said baffle plate to clamp the guard plate against said flange.

4. A strainer including a liquid receiving bowl, a shoulder formed therein, a guard plate adapted to extend over said shoulder, a ring of perforations on said guard plate and a central closed portion thereof, a baffle plate covering the perforated portion of said guard plate and spaced therefrom, a central opening in said guard plate to permit the liquid in said bowl to rest directly upon said central closed portion of said guard plate, and means on said bowl cooperable with said baffle plate to clamp said baffle plate and guard plate against said shoulder.

5. A strainer including a funnel portion having a discharge opening therein, means in said discharge opening forming a support, a strainer element adapted to rest on said support, a strainer plate having perforations therein, clamping said element against said support, a clamping plate engaging said strainer plate circumferentially, and lugs on said funnel portion engageable with said clamping plate by a rotary movement of said clamping plate with respect to said strainer plate.

6. A strainer including a funnel portion having a discharge opening therein, means in said discharge opening adapted to support a strainer element, a strainer element, a strainer plate clamping said element against said supporting means, a circular raised portion adjacent the periphery of said strainer plate, a clamping plate engageable with said raised portion, and lugs on said funnel cooperable with said clamping plate for engagement with a rotary movement of said clamping plate.

7. A strainer including a milk containing bowl, an inwardly extending flange in said bowl, adapted to support the peripheral edge of a flexible straining pad, a strainer guard plate having a section of perforations thereon and a closed portion, a baffle plate having an opening to permit the head of milk within the bowl to rest upon said closed portion of said guard plate, said baffle plate being rotatable relative to said guard plate, and means on said bowl rotatably engageable with said baffle plate to clamp the guard plate against said flange.

ALVIN W. FRANZMEIER.